Patented Oct. 20, 1953

2,656,339

UNITED STATES PATENT OFFICE 2,656,339

POLYMERIZABLE COMPOSITIONS COMPRISING ACRYLONITRILE AND A VINYL OR ISOPROPENYL AMINO AROMATIC COMPOUND AND POLYMERIZATION PRODUCTS THEREOF

John J. Padbury, Springdale, Conn., assignor to American Cyanamid Company, New York, N. Y., a corporation of Maine No Drawing. Application July 17, 1951, Serial No. 237,294

9 Claims. (Cl. 260—85.5)

This invention relates to the production of new synthetic materials having valuable and characteristic properties, and more particularly is concerned with polymerizable and polymerized acrylonitrile compositions. Still more particularly the present invention is directed to polymerizable compositions comprising (1) acrylonitrile and (2) a compound of the class of compounds represented by the general formula

I

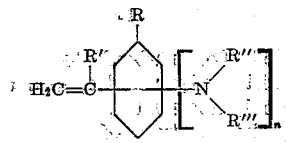

where R and R' each represents a member of the class consisting of hydrogen and the methyl radical, R'' and R''' each represents a member of the class consisting of hydrogen and lower alkyl radicals, more particularly alkyl radicals containing from 1 to 5 carbon atoms, inclusive, and $n$ represents a number selected from the class consisting of 1 and 2, the compound of (2) constituting from about 1% to about 20% by weight of the total amount of (1) and (2); to products comprising such polymerized compositions, e. g., a copolymer of a mixture of copolymerizable components including (1) acrylonitrile and (2) a compound (or a plurality of compounds in any proportions) of the class of compounds represented by Formula I in a weight ratio of from about 1% to about 20% (more particularly from about 1 or 2% to about 10 or 15%) of the latter to from about 99% to about 80% (more particularly from about 98 or 99% to about 85 or 90%) of the former; and to methods of preparing such products.

In the above formula, R'' and R''' each can be hydrogen, or one can be hydrogen and the other an alkyl radical containing from 1 to 5 carbon atoms, inclusive, or both can be the same or different alkyl radicals of the kind just mentioned. Illustrative examples of the aforesaid alkyl radicals included in the definition of R'' and R''' are methyl, ethyl, propyl, isopropyl, n-butyl, sec.-butyl, tert.-butyl, pentyl, etc.

Illustrative examples of vinyl amino and isopropenyl amino aromatic compounds embraced by Formula I that can be used alone, or in conjunction with one or more other comonomers, in carrying the present invention into effect are as follows:

2-aminostyrene (o-vinylaniline)
3-aminostyrene
4-aminostyrene
2,3-diaminostyrene (3-vinyl-o-phenylene diamine)
2,4-diaminostyrene
2,5-diaminostyrene
3,4-diaminostyrene
2-(methylamino)styrene
3-(methylamino)styrene
4-(methylamino)styrene
2-(ethylamino)styrene
3-(propylamino)styrene
4-(n-butylamino)styrene
2-(dimethylamino)styrene
3-(dimethylamino)styrene
4-(dimethylamino)styrene
2-(diethylamino)styrene
3-(diisopropylamino)styrene
4-(dipentylamino)styrene
2-(N-methyl-N-ethylamino)styrene
3-(N-propyl-N-sec.-butylamino)styrene
4-(N-n-butyl-N-pentylamino)styrene
3,5-bis(dimethylamino)styrene (N,N,N',N'-tetramethyl-5-vinyl-m-phenylenediamine)
2-amino-5-methylstyrene
4-amino-3-methylstyrene
4-(dimethylamino)-3-methylstyrene
2-(diethylamino)-5-methylstyrene
3-(methylamino)-4-methylstyrene
3-(n-butylamino)-4-methylstyrene
2,4-bis(dimethylamino)-5-methylstyrene
2,4-bis(diethylamino)-5-methylstyrene
4-amino-α-methylstyrene (p-isopropenylaniline)
4-amino-3,α-dimethylstyrene (2-methyl-4-isopropenylaniline)
3-(dimethylamino)-α-methylstyrene
2,4-bis(dimethylamino)-5,α-dimethylstyrene The ortho-, meta- and para-dimethylaminostyrenes, which may be collectively designated as "dimethylaminostyrene" (N-dimethylaminostyrene or N,N-dimethylaminostyrene), can be represented by the following formula:

II

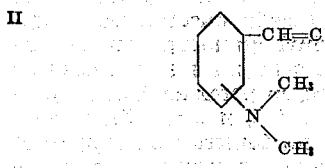

The various isomers of aminostyrene (monoaminostyrene) can be represented by the following formula:

III

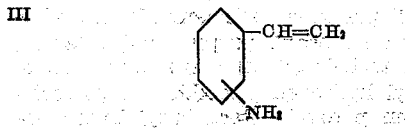

The various isomers of amino methyl styrene can be represented by the following formula:

IV
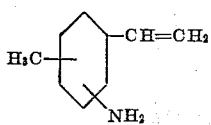

The various isomers of isopropenylaniline can be represented by the following formula:

V
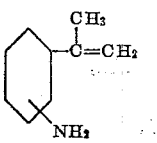

The present invention has, as one of its main objects, the production of new acrylonitrile copolymer compositions which are more readily dyed, especially with acid dyes, than homopolymeric acrylonitrile or many of the copolymers of acrylonitrile and another monomer or monomers that were known or suggested prior to my invention.

Another object of the invention is to prepare such copolymers which can be spun or otherwise shaped to form filaments, tapes, ribbons, rods, sheets, etc., and the shaped articles then dyed either before or after having been oriented or treated to improve their useful properties.

Other objects of the invention will be apparent to those skilled in the art from the description and examples which follow.

These objects are accomplished, in general, by preparing a copolymer of ingredients comprising acrylonitrile and one or more substituted aromatic compounds of the kind embraced by Formula I. The copolymer advantageously is produced, for instance, by polymerizing in an aqueous medium, with the aid of a polymerization catalyst or catalysts, a mixture of monomers including acrylonitrile and the vinyl or isopropenyl amino compound, the latter constituting from about 1% to about 20%, more particularly from about 1 or 2% to about 10 or 15%, by weight of the total amount of the vinyl (or isopropenyl) amino compound and acrylonitrile employed; and, at the end of the polymerization period, isolating the resulting copolymer.

Any suitable means may be used in effecting copolymerization of the basic comonomer embraced by Formula I with the acrylonitrile. Heat, light, or both heat and light, with or without a polymerization catalyst, can be used. A polymerization catalyst preferably is employed in order to shorten the period of time required for polymerization of the mixture of ingredients comprising acrylonitrile and aforesaid basic comonomer. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dibutyl peroxide, dilauryl peroxide, dioleyl peroxide, distearyl peroxide, di-(tert.-butyl) peroxide and di-(tert.-amyl) peroxide, such peroxides often being designated as ethyl, propyl, butyl, lauryl, oleyl, stearyl, tert.-butyl and tert.-amyl peroxides; the alkyl hydrogen peroxides, e. g., tert.-butyl hydrogen peroxide (tert.-butyl hydroper- oxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., actyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide catalysts that can be employed are the following:

Tetralin hydroperoxide
Tert.-butyl diperphthalate
Cumene hydroperoxide
Tert.-butyl perbenzoate
2,4-dichlorobenzoyl peroxide
Urea peroxide
Caprylyl peroxide
p-Chlorobenzoyl peroxide
2,2-bis(tert.-butyl peroxy)butane
Hydroxyheptyl peroxide
Diperoxide of benzaldehyde Other so-called "free radical" types of catalysts, e. g., $\alpha,\alpha'$-azodiisobutyronitrile, also can be used to accelerate polymerization.

If desired, the mixture of monomers can be polymerized in emulsion or in solution state to yield a copolymer. Good results are obtained by effecting copolymerization while the monomers are dissolved in a suitable solvent, preferably water or a liquid solvent comprising mainly water. Suitable inert organic solvents also can be used if desired, e. g., benzene, toluene, xylene, etc. Preferably the copolymerization reaction is carried out in a liquid medium in which the monomeric mixture is soluble but the copolymer is insoluble, e. g., water.

The polymerization also can be effected by conventional bulk polymerization technique, in the presence or absence of a solvent capable of dissolving the monomeric mixture and in which the latter preferably is inert; or by conventional bead polymerization methods. The polymerization of the mixture of monomers can be effected by a continuous process as well as by a batch operation.

The concentration of the catalyst is relatively small, e. g., from, by weight, about 1 part of catalyst per 1000 parts of the monomeric mixture to about 3 or 4 parts of catalyst per 100 parts of the mixture of monomers.

The temperature of polymerization of the polymerizable composition comprising acrylonitrile and one or more vinyl (or isopropenyl) aromatic compounds of the kind with which this invention is concerned, and in the proportions specified in the first paragraph of this specification, can be varied over a wide range, up to and including or slightly above the boiling point (at atmospheric pressure) of the monomeric mixture. In most cases, the polymerization temperature will be within the range of about 20° or 30° C., preferably at least 35° or 40° C., up to the boiling temperature of the mixture of monomers, depending, for example, upon the particular catalyst, if any, used, the rapidity of polymerization wanted and other influencing factors. The use of polymerization temperatures substantially above the boiling point of the mixture of monomers is not precluded, but generally is less desirable because the polymerization reaction then must either be carried out in a closed reaction vessel under pressure, or, for economical reasons, with a reflux condenser or other means provided for the recovery and re-use of the volatilized monomer or monomers if the reaction is carried out at the boiling temperature of the mass under atmospheric pressure.

If desired, the monomers may be copolymerized in the presence of a plasticizer for the copolymer. Other copolymerization methods, however, also may be employed, e. g., methods such as those described in U. S. Patents 2,140,048; 2,160,054; 2,194,354; 2,333,635; 2,436,926; and British Patent 586,881 with reference to the production of other polymerization products. The copolymers of ingredients comprising combined acrylonitrile and the above-described vinyl (or isopropenyl) amino aromatic compound can be produced in various molecular weights, depending, for instance, upon the particular polymerization conditions employed, but ordinarily are within the range of about 15,000 to about 300,000 or higher as calculated from viscosity measurements using the Staudinger equation (reference: U. S. Patent No. 2,404,713).

If the copolymerization reaction is carried out while the mixed monomers are dissolved or dispersed in a liquid medium, e. g., in solution in water, the resulting copolymer then is separated from the said medium by any suitable means, e. g., by filtration, centrifuging, solvent extraction, etc.

In order that those skilled in the art may better understand how the present invention can be carried into effect, the following examples are given by way of illustration and not by way of limitation. All parts and percentages are by weight.

Example 1

This example illustrates the preparation of homopolymeric acrylonitrile, which is subsequently employed in comparative tests with the copolymers of the present invention.

A reaction vessel, equipped with a stirrer, reflux condenser, thermometer and gas-inlet tube, is placed in a constant-temperature bath which is maintained at 35° C. To the vessel is added a solution of 53.0 parts of acrylonitrile, 900 parts of distilled water and 0.29 part of sulfuric acid. The pH of the initial solution is 3.1. A rapid stream of pre-purified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium bisulfite (meta), each dissolved in 50 parts of water, is then added. The solution first becomes cloudy at the end of 3 minutes, and the polymerization is fairly exothermic for the first half hour. The polymerization is continued for a total of 4 hours at 35° C. The polymer is collected on a Büchner funnel, and washed with 1000 parts of distilled water followed by about 160 parts of methanol. The polymer is dried in an oven at 70° C. for about 16 hours. The yield of dry polyacrylonitrile, which is white, amounts to 48 parts.

Example 2

A reaction vessel, equipped with a stirrer, reflux condenser, thermometer and gas-inlet tube, is placed in a constant-temperature bath which is maintained at 35° C. To the vessel is added a solution of 73.5 parts of acrylonitrile, 1.5 parts of p-(dimethylamino)styrene, 1070 parts of distilled water and 0.95 part of a suitable emulsifying agent, more particularly Duponol ES which is understood to be a sodium salt of a long-chain alkyl sulfate. A rapid stream of pre-purified nitrogen is passed over the surface of the solution for 30 minutes. The nitrogen flow is then reduced to about one bubble per second. To the reaction vessel is then added 1.5 parts of a polymerization catalyst, specifically $\alpha,\alpha'$-azodiisobutyronitrile. The polymerization is carried out for 2 hours at 70° C. The resulting copolymer of acrylonitrile and p-(dimethylamino)styrene is collected on a Büchner funnel, washed with 2000 parts of deionized water and dried in an oven at 70° C. for about 16 hours. The dried copolymer is a light, cream-colored material, and is obtained in a yield amounting to 59 parts.

Example 3

To a reaction vessel, equipped as in Example 2, is added a solution of 71.25 parts of acrylonitrile, 3.75 parts of p-(dimethylamino)styrene, 1000 parts of distilled water and 1.0 part of an emulsifying agent comprising the sodium salt of lauryl sulfate. A rapid stream of pre-purified nitrogen gas is passed over the surface of the solution for 30 minutes. The nitrogen flow is then reduced to about one bubble per second. To the vessel is then added 1.5 parts of $\alpha,\alpha'$-azodiisobutyronitrile. The polymerization is carried out for 3.7 hours at 63°–68° C. The resulting copolymer of the aforementioned starting comonomers is collected on a Büchner funnel, washed with 2000 parts of deionized water, and then dried in a 70° C. oven for about 16 hours. The yield of dried copolymer, which is a light, cream-colored material, amounts to 54.5 parts.

Example 4

Essentially the same conditions and procedure are employed as in Example 3 with the exception that the p-(dimethylamino)styrene is replaced with an equal weight of 3-amino-4-methylstyrene, 5 parts instead of 1 part of the emulsifying agent employed in Example 3 is used, and the polymerization time at 63°–68° C. is 4 hours. The yield of dry, cream-colored copolymer of acrylonitrile and 3-amino-4-methylstyrene amounts to 66 parts.

Example 5

Samples of the homopolymeric acrylonitrile of Example 1 and of the copolymers of Examples 2, 3 and 4 are subjected to the following dye test:

A sample (5 parts) of the dry polymer or copolymer (ground in a mill to pass through a 20-mesh screen) is added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath is boiled for 30 minutes, after which the polymerization product is filtered off and washed with hot water until the water is free of dye. The copolymers of Examples 2, 3 and 4 are dyed blue, whereas the homopolymeric acrylonitrile of Example 1 fails to absorb any dye. The advantage of replacing a part (e. g., from about 1% to about 20% or more, still more particularly from 1 or 2% to about 5 or 10 or 15%) of the initial acrylonitrile with a vinyl amino aromatic compound or an isopropenyl amino aromatic compound of the kind with which this invention is concerned, thereby to obtain a co-polymeric acrylonitrile substance of improved dyeability, is therefore quite apparent.

Example 6

A reaction vessel, equipped with a stirrer, reflux condenser, thermometer and gas-inlet tube, is placed in a constant-temperature bath which is maintained at 60° C. To the vessel is added a solution of 47.7 parts of acrylonitrile, 5.3 parts of p-(dimethylamino)styrene, 900 parts of distilled water and 1.8 parts of sulfuric acid. A rapid stream of pre-purified nitrogen is passed over the surface of the solution for 30 minutes. The nitrogen flow is then reduced to about one bubble per second. To the vessel are next added 1.71 parts of ammonium persulfate, $(NH_4)_2S_2O_8$, and 0.71 part of sodium bisulfite (meta), $Na_2S_2O_5$, each dissolved in 50 parts of distilled water. The polymerization is carried out for 4 hours at 60° C. The resulting copolymer is filtered off and dried at 70° C. It is a dark, brittle material having a nitrogen content of 22.46%. The specific viscosity of a 1% solution of this copolymer in dimethyl formamide at 25° C. is 0.23.

Example 7

Same as in Example 2 with the exception that instead of 73.5 parts of acrylonitrile there are used 70 parts of acrylonitrile and, in addition, 3.5 parts of methyl acrylate. Similar results are obtained.

Example 8

Same as in Example 2 with the exception that instead of 73.5 parts of acrylonitrile there are used 70 parts of acrylonitrile and, in addition, 3.5 parts of acrylamide. Similar results are obtained.

Example 9

A round-bottomed reaction vessel equipped with a reflux condenser and heated on an oil bath is charged with 5 parts of p-(dimethylamino)styrene, 45 parts of acrylonitrile, 100 parts of toluene and 1 part of $\alpha,\alpha'$-azodiisobutyronitrile. After heating the resulting reaction mass for two hours under reflux at boiling temperature, the precipitated copolymer of acrylonitrile and p-(dimethylamino)styrene is filtered off and dried. The yield amounts to 35 parts.

Example 10

To a reaction vessel equipped with a stirrer, reflux condenser and thermometer are charged 300 parts of deoxygenated distilled water, 20 parts of acrylonitrile, 0.6 part of an aminostyrene comprising about 60% para, 30% meta and 10% ortho isomers, and 0.412 part of $\alpha,\alpha'$-azodiisobutyronitrile. The resulting reaction mass is heated for 130 minutes at 70° C., after which the precipitated copolymer of acrylonitrile and aminostyrene isomers is washed first with water and then with methanol. The yield of dry copolymer, which is light in color, amounts to 10.5 parts.

Example 11

To a reaction vessel equipped with a stirrer, reflux condenser and thermometer are charged 1500 parts of deoxygenated distilled water, 95 parts of acrylonitrile and 1 part of $\alpha,\alpha'$-azodiisobutyronitrile. The resulting solution is heated to 60° C. until polymerization starts, at which time the addition of p-isopropenylaniline (total amount, 5 parts) is begun. The isopropenylaniline is added over a period of 270 minutes, after which the reaction mass is heated at 60° C. for an additional period of ½ hour. The precipitated copolymer of acrylonitrile and p-isopropenylaniline is collected on a filter, washed with water, then with methanol, and dried at 70° C. in vacuo for 5 hours. The yield of dry, light-colored copolymer amounts to 22.5 parts.

It will be understood, of course, by those skilled in the art that my invention is not limited to the specific ingredients named in the above illustrative examples nor to the particular proportions and methods of copolymerization mentioned therein. Thus, instead of the $\alpha,\alpha'$-azodiisobutyronitrile catalyst named in the different examples, any other polymerization catalyst or combination of polymerization catalysts, numerous examples of which have been given hereinbefore, can be used. Other catalysts and redox-catalyst systems that can be employed are given in, for example, the copending application of Arthur Cresswell, Serial No. 76,667, filed February 15, 1949, and in the various patents mentioned therein.

Likewise, other modifying comonomers, in addition to the methyl acrylate named in Example 7 and the acrylamide specified in Example 8 can be used. Illustrative examples of such comonomers are vinyl compounds which are different from acrylonitrile (vinyl cyanide) and the vinyl aromatic and isopropenyl aromatic compounds, which are different from the aromatic compounds embraced by Formula I, more particularly the different vinyl aromatic and isopropenyl aromatic hydrocarbons (e. g., styrene, isopropenyl toluene, the various dialkyl styrenes, etc.), other aliphatic compounds containing a $CH_2=C<$ grouping, e. g., the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and N-substituted alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

The proportions of any modifying comonomer or comonomers that are incorporated in the polymerizable composition together with the acrylonitrile and the vinyl (or isopropenyl) amino aromatic compound can be varied as desired or as conditions may require. Ordinarily, however, the acrylonitrile constitutes a major or preponderant proportion (more than 50%) by weight of the total weight of monomers to be copolymerized, the vinyl (or isopropenyl) amino compound constitutes from about 1% to about 20% of the total weight of the acrylonitrile and vinyl (or isopropenyl) amino compound, and any modifying comonomer or comonomers (if present in the polymerizable mixture) constitute the remander of the total amount of comonomers which are subjected to copolymerization.

In the preferred copolymer compositions (more particularly thermoplastic copolymer compositions) of the present invention, the acrylonitrile is employed in the mixture of comonomers in an amount such that at least 85% by weight of combined acrylonitrile is present in the copolymer. When the polymerization rates of the acrylonitrile and additional monomer or monomers are different from each other, then it may be necessary to start with an amount of acrylonitrile either more or less than 85% by weight of the total mixture of monomers in order that the final copolymer will contain at least 85% by weight of combined acrylonitrile in the copoylmer molecule. Similarly, in order that the finished copolymer shall contain, in the copolymer molecule, from about 1% to about 20% by weight of combined aromatic compound of the kind embraced by Formula I, preferably between about 2 or 3% and about 10 or 15%, it may be necessary to start with an amount of the said aromatic compound, either more or less than that which is present in the finished copoylmer in order that the said copolymer will have the ultimate composition desired or required in order to impart optimum dye receptivity thereto.

Although the new copolymers of this invention are particularly useful in the formation of fibers or filaments which are more amenable to dyeing than homopolymeric acrylonitrile, they also have numerous other applications in the plastics and coating arts. For instance, with or without a filler or other additive, they may be used as molding compositions (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions of my invention can be used in the production of castings of any desired shape or size; as adhesives; in the treatment of paper or paper stock; in coating compositions; and for various other purposes. The copolymer can be formed in situ after application of the monomeric mixture to the base material to be coated, impregnated or otherwise treated.

Fibers can be produced from the copolymers of the present invention in the manner described in, for example, Cresswell Patents 2,558,730 and 2,558,731 and Cresswell and Wizon Patent 2,558,733. The unoriented and oriented fibers produced from my new copolymers are readily dyed, especially with an acid dye, while the fiber is in either a gel (e. g., hydrogel or aquagel) or a dry state.

I claim:

1. A polymerizable composition comprising (1) acrylonitrile and (2) a compound of the class of compounds represented by the general formula:

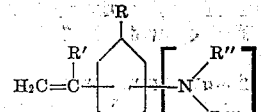

where R and R' each represents a member of the class consisting of hydrogen and the methyl radical, R'' and R''' each represents a member of the class consisting of hydrogen and lower alkyl radicals containing from 1 to 5 carbon atoms, inclusive, and n represents a number selected from the class consisting of 1 and 2, the compounds of (2) constituting from about 1% to about 20% by weight of the total amount of (1) and (2).

2. A product comprising the polymerized composition of claim 1.

3. A composition comprising a copolymer of a mixture of copolymerizable components including (1) acrylonitrile and (2) a compound of the class of compounds represented by the general formula:

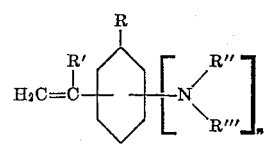

where R and R' each represents a member of the class consisting of hydrogen and the methyl radical, R'' and R''' each represents a member of the class consisting of hydrogen and lower alkyl radicals containing from 1 to 5 carbon atoms, inclusive, and n represents a number selected from the class consisting of 1 and 2, the compound of (2) constituting from about 1% to about 15% by weight of the total amount of (1) and (2).

4. A composition comprising a copolymer of a mixture of copolymerizable components including (1) acrylonitrile and (2) a dialkylaminostyrene, said compound of (2) being otherwise unsubstituted and each of the alkyl radicals attached to the amino nitrogen atom containing from 1 to 5 carbon atoms, inclusive, and the said compound of (2) constituting from about 1% to about 15% by weight of the total amount of (1) and (2).

5. A composition comprising a copolymer of a mixture of copolymerizable components including (1) acrylonitrile and (2) dimethylaminostyrene, the compound of (2) constituting from about 1% to about 15% by weight of the total amount of (1) and (2).

6. A composition comprising a copolymer of a mixture of copolymerizable components including (1) acrylonitrile and (2) an aminostyrene represented by the formula:

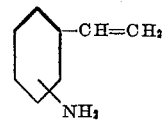

the compound of (2) constituting from about

1% to about 15% by weight of the total amount of (1) and (2).

7. A composition comprising a copolymer of a mixture of copolymerizable components including (1) acrylonitrile and (2) an amino methyl styrene represented by the formula:

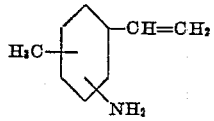

the compound of (2) constituting from about 1% to about 15% by weight of the total amount of (1) and (2).

8. A composition comprising a copolymer of a mixture of copolymerizable components including (1) acrylonitrile and (2) an isopropenylaniline represented by the formula:

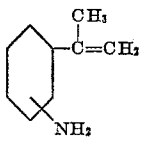

the compound of (2) constituting from about 1% to about 15% by weight of the total amount of (1) and (2).

9. The method of preparing a new copolymer which comprises polymerizing in an aqueous medium, with the aid of a polymerization catalyst, a mixture of copolymerizable components including (1) acrylonitrile and (2) a compound of the class of compounds represented by the general formula:

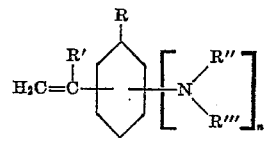

where R and R' each represents a member of the class consisting of hydrogen and the methyl radical, R'' and R''' each represents a member of the class consisting of hydrogen and lower alkyl radicals containing from 1 to 5 carbon atoms, inclusive, and $n$ represents a number selected from the class consisting of 1 and 2, the compound of (2) constituting from about 1% to about 20% by weight of the total amount of (1) and (2).

JOHN J. PADBURY.

References Cited in the file of this patent

UNITED STATES PATENTS

| Number | Name | Date |
|---|---|---|
| 2,500,025 | Dickey et al. | Mar. 7, 1950 |